3,132,920
PROCESS FOR RECOVERY OF VANADIUM
VALUES FROM AQUEOUS LIQUORS
Mayer B. Goren, Denver, Colo., assignor to Kerr-McGee Oil Industries, Inc., a corporation of Delaware
No Drawing. Filed Aug. 31, 1960, Ser. No. 53,051
6 Claims. (Cl. 23—18)

This invention broadly relates to an improved hydrometallurgical process for the recovery of vanadium and, in one of its more specific aspects, the invention further relates to an improved process for the oxidation of quadrivalent vanadium.

The quinquevalent form of vanadium is useful in the manufacture of high purity ammonium metavanadate, conventional "red cake" (a sodium deutero-hexavanadate), the fused "black cake" of commerce which is derived by fusion of "red cake" at high temperature, and high purity vanadium pentoxide. The process of the present invention is especially useful in the oxidation of quadrivalent vanadium to quinquevalent vanadium when using a free oxygen-containing gas as the oxidizing agent. Prior art processes concerned with achieving low temperature oxidation of quadrivalent or lower valent forms of vanadium to the quinquevalent state in alkaline solution have heretofore employed expensive chemical oxidizing agents such as sodium peroxide, hydrogen peroxide, chlorine, chlorine dioxide or alkaline hypochlorites. Other expensive oxidizing agents such as potassium permanganate, chlorine, sodium hypochlorite and sodium chlorate have been used heretofore in oxidizing quadrivalent vanadium to the quinquevalent state in acidic solution.

In alkaline or neutral solution, the oxidized quinquevalent vanadium is soluble and occurs as a colorless vanadate which may take the form of any of a number of species of anion, depending upon the basicity of the solution. Among these are the ortho, pyro and metavanadates, $VO_4^{-3}$, $V_2O_7^{-4}$, and $VO_3^-$, respectively, and still other forms are known. In dilute acid solution, quinquevalent vanadium may be present in colored anionic form as a variety of species of polyvanadate, depending upon the hydrogen ion concentration, while in strongly acidic solutions it is largely present as the cation $VO_2^+$. Quadrivalent vanadium is usually found in acidic aqueous solutions as the blue $VO^{++}$ (vanadyl) cation and it is hydrolytically precipitated from such aqueous solutions when the pH is raised by addition of base, with the precipitation of quadrivalent hydrous vanadium oxide beginning at a pH of about 3.5–4 and being substantially completed at a pH of 6.5–7.0. Quadrivalent hydrous vanadium oxide is slightly amphoteric and thus the precipitate will dissolve to a small extent in bases to form colored vanadites or hypovanadates, usually ($V_4O_9^{--}$). Still lower valence forms of vanadium than quadrivalent are known, but they are strong reducing agents and are oxidized readily to the quadrivalent form. Accordingly, such lower valance forms may be treated as being equivalent to the quadrivalent form of vanadium for the purposes of the invention since they may be as readily oxidized to the quinquevalent form as quadrivalent vanadium. In the interest of clarity, the term quadrivalent vanadium in the specification and claims is intended to include such lower valence forms of vanadium unless indicated to the contrary.

It has been discovered that quadrivalent vanadium in the form of its hydrous oxide may be readily, economically and substantially quantitatively converted into quinquevalent vanadium by oxidation with an elemental oxygen containing gas. It has been further discovered that impure quadrivalent vanadium containing substances such as leach liquors or vanadium bearing precipitates which contain an impurity such as iron, aluminum or manganese may be readily purified and a high grade quinquevalent vanadium product produced when operating in accordance with the present invention for the first time in the art. Thus, the process of the present invention is capable of producing from an impure, low grade quadrivalent vanadium product a high grade, commercially acceptable quinquevalent vanadium product without the requirement for an expensive oxidizing agent or an involved purification procedure.

It is an object of the present invention to provide an improved process for the recovery of vanadium.

It is a further object of the present invention to provide an improved process for the oxidation of quadrivalent and lower valence forms of vanadium to quinquevalent vanadium.

It is still a further object of the present invention to provide a novel process for the oxidation of quadrivalent and lower valence forms of vanadium to the quinquevalent state which does not require an expensive oxidant and in which elemental oxygen-containing gas may be used as the oxidizing agent.

It is still a further object of the present invention to provide a novel process for purifying a vanadium-containing product, and/or producing a commercial vanadium product of high purity.

It is still a further object of the present invention to provide an improved process for the preparation of high purity ammonium metavanadate.

Still other objects of the present invention and the advantages thereof will be apparent to those skilled in the art upon reference to the following detailed description and the specific examples.

In accordance with one embodiment of the invention, quadrivalent hydrous vanadium oxide, and lower valence forms of vanadium which readily yield quadrivalent hydrous vanadium oxide, may be readily, economically and substantially quantitatively converted into quinquevalent vanadium through the expedient of intermixing or contacting such hydrous oxides with an elemental oxygen containing gas in an alkaline aqueous medium. The oxidation has been found to proceed readily even under ambient temperature conditions such as 20–25° C., but it is markedly accelerated by heating to elevated temperatures such as at least 60–70° C. and up to 100° C., or to the boiling point of the aqueous medium under the existing pressure conditions. Under superatmospheric pressure, if desired the oxidation may be conveniently carried out at temperatures higher than the normal boiling point of the aqueous medium. The elemental oxygen containing gas may be atmospheric air, atmospheric air enriched with oxygen or ozone, high or low purity commercial oxygen, ozone, etc. Atmospheric air is entirely satisfactory and is normally preferred for economic reasons.

The oxidation of quadrivalent vanadium by atmospheric air does not proceed to a practical degree of completion in neutral or acidic solutions. Also, an excess of the alkaline substance should be present and preferably in an amount substantially greater than stoichiometric quantities for complete, efficient conversion of quadrivalent vanadium to the quinquevalent state. A satisfactory initial pH level, i.e., the pH before oxidation of vanadium values, has been found to be about 7.5 or higher, with a pH level of 8–14 or, preferably, 10–12 usually being preferred throughout the oxidation. In instances where it is desired to oxidize only a portion of the vanadium content in a given charge of quadrivalent hydrous oxide, then lesser quantities of alkaline reagent may be employed and the initial pH of the suspension may be from about 7.5 to 10 and may not be adjusted as the oxidation progresses, and thus the pH falls below the initial level.

The quinquevalent vanadium formed during the oxidation dissolves in the excess alkali present and thereby absorbs equivalents of alkali. Thus, it will be apparent that one may oxidize and solubilize small increments of the contained quadrivalent oxide content by employing relatively small amounts of alkali and aerating until the reaction substantially ceases. At this point, additional alkali may be added, or the suspension may be filtered to separate a solution containing quinquevalent vanadium only. The oxidation may be continued, if desired, on the remaining hydrous vanadium oxide after further addition of alkali to thereby obtain further quantities of the quinquevalent vanadium. Where present, the invention offers an efficient method for the separation of vanadium values from insoluble impurities which are not oxidized to a soluble state by the relatively mild oxidizing conditions. The alkaline reagent or base should be present in the aqueous medium in an amount of at least one chemical equivalent of base for each chemical equivalent of vanadium as the hydrated oxide which is oxidized and, preferably, one to four chemical equivalents of base are present. A much larger amount of base may be present, if desired.

The aeration may be effected by any suitable desired means such as in a so-called Pachuca tank having a cone bottom provided with an air inlet at the bottom, or in a flotation cell in some instances. For best results, the air should be introduced in the form of bubbles as small as practical by means of a diffuser plate or the like. Agitation also aids in increasing the rate of oxidation, and optimum results usually are obtained under very vigorous agitation and aeration.

A wide variety of alkaline reagents may be used at both ambient and elevated temperature in practicing the present invention. However, some alkaline substances are more effective than others. For instance, it has been found that sodium or potassium carbonates are not as effective as sodium and potassium hydroxide. Surprisingly, ammonium carbonate is more effective than sodium or potassium carbonate and, similarly, ammonia or ammonium hydroxide is more effective than either sodium or potassium carbonates or hydroxides. It has been further discovered that small or catalytic quantities of copper and cobalt are highly effective catalysts and greatly increase the already satisfactory oxidation rate. It is understood that such metals are probably present in solution in the form of ions or their respective ammonium complexes. They may be added to the aqueous suspension to be oxidized in the form of simple salts such as their sulfates, chlorides, or as ammonia complexes.

The hydrous quadrivalent vanadium oxide for use in the oxidation process of the invention may be conveniently prepared by the hydrolytic precipitation of the vanadium content of an aqueous acidic solution by addition at either ambient or elevated temperature of a suitable alkaline reagent such as sodium or potassium carbonate, ammonia or ammonium hydroxide, sodium or potassium hydroxide, etc. The hydrous oxide may be left in suspension in the original liquor from which it was precipitated and a suitable excess of alkaline reagent added thereto prior to or during the oxidation step. In some instances, it may be preferred to separate the precipitated hydrous vanadium oxide by filtration, wash the precipitate with water, and then resuspend the solids in a different alkaline solution for subsequent oxidation.

The process of the invention is capable of wide variations to effect a given desired end. For instance, the process may be adapted to the winning of vanadium from its ores, and especially by acid leaching techniques such as are becoming more prominent in present-day technology. The air oxidation of hydrous quadrivalent vanadium oxide in alkaline suspension serves to dissolve the vanadium as one of the anionic species mentioned hereinabove, while a variety of contaminant metals which often accompany vanadium in acidic solutions such as iron, aluminum and manganese are not oxidized to a soluble form under the existing oxidation conditions and may be separated from the resulting solubilized vanadium by simple filtration or other clarification processes. This feature of the present invention results in a process which is uniquely adaptable to the production of high purity ammonium metavanadate from a variety of solutions, and especially from high grade vanadium strip liquors such as are obtained in solvent extraction or ion exchange vanadium recovery processes. This may be effected without a requirement for expensive chemical oxidizing agents such as sodium peroxide, alkali chlorates or hydrogen peroxide. Thus, the process of the invention is very attractive from an economic standpoint as well as from the standpoint of being able to produce a commercially satisfactory high grade product regardless of the concentration of the usual contaminating metal values in the original starting material.

The foregoing detailed description and the following specific examples are for purposes of illustration only and are not intended as being limiting to the spirit or scope of the appended claims.

*Example I*

Quadrivalent vanadium in dilute aqueous acidic solution is readily amenable to recovery by solvent extraction processes, such as, for example, by contacting the vanadium liquor with a 0.3 molar solution of di-2-ethyl hexyl phosphoric acid (D2-EHPA) in kerosene. The loaded organic phase thus obtained can be stripped of its vanadium content by contact with a warm dilute acid solution, 1.0–1.5 molar sulfuric acid being preferred.

A strip liquor was prepared as mentioned above using 1.0 molar sulfuric acid as the stripping agent. Its partial composition was 46.7 g. vanadium/liter (expressed as $V_2O_5$), 2.7 g. Fe/liter and about 100 g. $SO_4$/liter. The pH of the solution as indicated by a glass electrode was about zero. Such a solution is ordinarily referred to as "blue liquor" in the art.

150 ml. of the above prepared blue liquor was neutralized by passing in ammonia gas to a pH of about 7.0. The quadrivalent vanadium and the iron both precipitated as their respective hydrous oxides. An additional 22 g. of ammonia was absorbed (a considerable excess) and air at 660 cc./min. was fed to the ambient temperature aqueous suspension of vanadium and iron hydrous oxides through a stainless steel diffuser immersed therein. In a period of 2 hours 32 minutes, substantially all of the grayish black precipitate of hydrated vanadium oxide ($V(OH)_4$) had dissolved to leave behind only a red brown residue of hydrated iron oxide. Some white particles of ammonium metavanadate also had formed in the solution and had partly coated the diffuser plate.

*Example II*

150 ml. of the blue liquor employed in Example I was neutralized with ammonia gas to precipitate the hydrous oxides of vanadium and iron, and the pulp was passed through a hand homogenizer to disperse the solids more effectively as a fine suspension. The resultant product pulp was diluted with an equal volume of water and 15 g. of additional ammonia was dissolved therein. Vigorous aeration (175 ml. air/min.) through a diffuser immersed in the suspension effected complete oxidation and solubilization of the vanadium contents at room temperature in 178 minutes, leaving only a residue of brown hydrous iron oxide. There was considerable excess of ammonia present, and in this more dilute solution no ammonium metavanadate precipitated.

*Example III*

900 ml. of the blue liquor employed in Example I was neutralized with ammonia to precipitate the hydrous oxides of vanadium and iron, the resultant pulp homogenized, an additional 30 g. $NH_3$ added (as concentrated ammonium hydroxide), and the pulp diluted to 1800 ml. Three hundred ml. aliquots of the pulp were taken for studying certain variables affecting the oxidation, as follows:

(a) 300 ml. of the pulp was heated in a water bath maintained at 70–80° C., and vigorous aeration was commenced at a rate of 1000 ml. air/minute. One ml. samples of the pulp were taken at intervals, diluted with 50 ml. of 2 M $H_2SO_4$ and the potential established between a platinum and saturated calomel electrode immersed in the resulting solution was measured (e.g. the electromotive force (E.M.F.) was measured in millivolts (mv.)). A reduced $V^{+4}$ solution exhibits an E.M.F. of about −400 m.v., while an oxidized solution will produce an E.M.F. of −700 to −800 mv. depending on concentration, pH, etc. Observation of the increase in negative E.M.F. with time is accordingly a means of monitoring the progress of the oxidation. The results of this test were as follows:

| Time (min.) of aeration: | E.M.F. of diluted pulp (mv.) in 50 ml. 2 M $H_2SO_4$ |
|---|---|
| 0 | 430 |
| 5 | 706 |
| 10 | 725 |
| 15 | 731 |
| 20 | 742 |
| 26 | 750 |

After 26 minutes substantially all of the gray $V(OH)_4$ precipitate had disappeared, leaving only the red brown iron oxide. It is evident that elevated temperature and increased aeration rate both serve to increase the rate of oxidation.

(b) A 300 ml. aliquot was heated to 70–80° C. and aerated at the rate of 1700 ml. air/min. for three minutes, followed by less vigorous aeration at the rate of 1000 ml./min. for the remainder of the time. One ml. samples of the pulp were taken at intervals, diluted with 50 ml. of 2 M $H_2SO_4$, and the potential measured by means of a platinum and saturated calomel electrode immersed in the solution. The following results were obtained:

| Time (min.): | E.M.F. of diluted pulp (mv.) in 50 ml. 2 M $H_2SO_4$ |
|---|---|
| 0 | 403. |
| 5 | 747 (oxidation complete). |

Violent aeration is very effective in speeding up the oxidation, and suggests that the reaction largely proceeds through gas-solid contacting. The 1700 ml. per minute aeration rate was too vigorous to maintain in the specific laboratory scale equipment available owing to excessive foaming. Accordingly lower aeration rates were ordinarily employed due to the limitations of the laboratory equipment available.

(c) A 300 ml. aliquot of pulp was heated to 70–80° C. and 100 mg. of $CuCl_2.2H_2O$ was added thereto. Aeration was then commenced at the rate of 1000 ml./min., aliquots being taken for following the progress of the oxidation and the E.M.F. measured as in (a) and (b) above. The following results were obtained:

| Time (min.): | E.M.F. of diluted pulp (mv.) |
|---|---|
| 0 | 438 (before $Cu^{++}$ addition). |
| 5 | 718. |
| 10 | 742 (oxidation essentially complete). |

A comparison of (a) and (c) shows that the oxidation rate was doubled by the addition of the small catalytic amount of copper.

(d) Experiment (c) was repeated except that 500 mg. of $CoCl_2$ was substituted for the hydrated copper chloride. The following results were obtained:

| Time (min.): | E.M.F. of diluted pulp (mv.) |
|---|---|
| 0 | 430 |
| 5 | 719 |
| 10 | 733 |
| 15 | 740 |

The results indicate the cobalt ammonia complex likewise to be a catalyst for the oxidation, but less effective than copper.

Example IV 150 ml. of the blue liquor employed in Example I was neutralized with a saturated solution of sodium carbonate to precipitate the hydrous oxides of vanadium and iron, the resultant pulp homogenized, and then the pulp was diluted to 300 ml. of water. Twelve g. of solid NaOH was added to the diluted pulp and the pulp heated to 75° C. and aerated at the rate of 1175 ml./min. Aliquots for E.M.F. determination were taken and the E.M.F. measured as in Example III. The following results were obtained:

| Time (min.): | E.M.F. of acidified diluted pulp (mv.) |
|---|---|
| 0 | 460. |
| 5 | 728. |
| 10 | 740 (aeration rate reduced to 1000 |
| 15 | 749 ml./min.). |

It is evident that sodium hydroxide is very effective in promoting the oxidation of vanadium, although somewhat less effective than ammonia.

Example V (a) 150 ml. of the blue liquor employed in Example I was neutralized with sodium carbonate, an excess of 32 g. $Na_2CO_3$ was added, and the procedure of Example IV otherwise followed with the exception that the aeration was at 75° C. at the rate of 1200 ml./min. The following results were obtained:

| Time (min.): | E.M.F. of acidified diluted pulp (mv.) |
|---|---|
| 0 | 441. |
| 5 | 690. |
| 10 | 741. |
| 17 | 750 (oxidation complete). |

In view of the above, soda ash is likewise effective in promoting the oxidation.

(b) The procedure of part (a) immediately above was repeated except that only 6.5 g. of $Na_2CO_3$ was added after neutralization. The following results were obtained:

| Time (min.) | E.M.F. (mv.) | Comments |
|---|---|---|
| 0 | 440 | |
| 5 | 672 | Silicone antifoam added to prevent loss of pulp. |
| 15 | 690 | |
| 26 | 708 | 2 g. of $Na_2CO_3$ added. |
| 45 | 727 | |
| 75 | 740 | |
| 90 | 742 | Oxidation substantially complete. |

The oxidized solution with its suspended iron oxide was acidified to the Congo red point with sulfuric acid and an excess of 4.5 g. of sulfuric acid added. The mixture was stirred and digested at 90–95° C. for an hour to precipitate a high grade red-brown hydrated vanadium pentoxide product.

Example VI

An iron free synthetic blue liquor was prepared at a concentration of 46 g. $V_2O_5$/liter and the pH was adjusted to 0.2 with sulfuric acid. 150 ml. of this liquor was neutralized with sodium carbonate to precipitate hydrous vanadium oxide and 5 g. of excess NaOH was added. The pulp was diluted with an equal volume of water, heated to 80° C. and aerated at the rate of 1200 ml./min. of air. In a period of about 19 minutes, all of the pulp had oxidized and dissolved to leave a clear, almost colorless sodium vanadate solution. Thus, the presence of iron in the liquor of the previous examples does not have any marked effect on the oxidation.

*Example VII*

(a) 150 ml. of the synthetic iron-free blue liquor (46 g. $V_2O_5$/liter) of Example VI was neutralized with ammonia to precipitate hydrous vanadium oxide, 5 g. of excess $NH_3$ was added, the pulp diluted to 300 ml., heated to 75° C., and aerated at the rate of 1200 ml. air/min. In 13 minutes, the oxidation was complete and all of vanadium oxide preciptate had dissolved. A one ml. aliquot of the colorless liquor, on dilution with 50 ml. of 2 M $H_2SO_4$, gave a solution having an E.M.F. of about —760 mv. On standing, this solution deposited a large amount of white crystals of substantially pure ammonium metavanadate which were readily recoverable by filtration.

(b) The procedure of part (a) immediately above was repeated except that 100 mg. of $CuCl_2 \cdot 2H_2O$ was added before aeration was commenced. In 6½ minutes, the solution was entirely clear and the blue color of the Cu-ammonia complex was apparent. This solution likewise deposited crystals of ammonium metavanadate as in part (a) above.

*Example VIII*

(a) A 10% solution of bis-2-ethyl hexyl phosphoric acid in kerosene was equilibrated with a vanadium leach liquor, and loaded to a level of 5.3 g. $V_2O_5$/liter. One aliquot of this loaded solvent was stripped by successive contacts with a solution containing equal parts of water and hydrochloric acid until the solvent was barren of vanadium. The strip liquor assayed as follows:

$V_2O_5$ ---------------------------- 50.5 g./l.
Fe ------------------------------- 1.5 g./l. (Fe+3).
$P_2O_5$ ---------------------------- 15 mg./l.

To remove ferric iron, the strip liquor was contacted with several portions of a solvent solution consisting of 4% trialkyl amine-4% isodecanol in kerosene. The amine is approximately a tridecyl-tridodecyl mixture and is capable of extracting iron as the deep yellow chloride complex from hydrochloric acid solutions. This amine solvent is regenerable by simple water stripping, and the step of contacting it with amine was continued until the water strip solution gave only a faint thiocyanate test for ferric ion. The thus treated strip liquor was analyzed and found to contain 50.5 g. $V_2O_5$/l. and no iron. The solution was then concentrated by evaporation and the hydrochloric acid recovered for further use.

(b) A second sample of the loaded organic solvent of part (a) immediately above was stripped in the same fashion as above with "constant boiling" HCl and the strip liquor freed of iron by percolating it through a small column of strongly basic anion exchange resin (Rohm & Haas IRA–400) in the chloride form. This likewise served to remove all iron from this strip solution. The solution was concentrated by evaporation and the hydrochloric acid recovered for re-use. When such concentrated iron-free vanadyl chloride solutions are diluted with water to give solutions of approximately 25 g. $V_2O_5$/liter and treated according to the procedures of Example VII, pure, iron-free ammonium metavanadate is obtained in good yield.

*Example IX*

This example illustrates a preferred method of preparing a high grade ammonium metavanadate product from solvent extraction acid strip liquors:

Two hundred ml. of actual sulfuric acid strip liquor (such as was prepared in Example I) was neutralized with ammonia gas to a pH just above 6.0. All the vanadium and iron content precipitated as their respective hydrous oxides. The pulp was hot as a result of the rapid neutralization and was filtered and washed briefly, and the filtrate retained for later use. The almost black wet product was suspended in 125 ml. water, 8 g. of sodium hydroxide was added, the pulp heated to 60° C. and aerated vigorously until all of the vanadium had dissolved and only hydrated iron oxide remained in suspension. The hot solution was then filtered with the aid of some diatomaceous earth to remove the iron oxide.

One-half of the vanadium barren strip liquor (now substantially an ammonium sulfate liquor) was heated to about 60° C. The filtered sodium vanadate solution prepared by air oxidation was also heated and the two combined and quickly filtered to remove a trace of yellowish flocculant precipitate. The filtrate was then allowed to crystallize. The product was filtered, displacement-washed several times, repulped in a very dilute $NH_4OH$, rewashed and dried. The almost pure, white product was assayed and found to be 99.7% pure ammonium metavanadate, and contained only 0.1% sulfate and .01% $P_2O_5$.

What is claimed is:

1. A process for recovering vanadium values from an acidic aqueous hydrometallurgical liquor containing dissolved quadrivalent vanadium values and at least one dissolved contaminant selected from the group consisting of aluminum, iron and manganese values comprising the steps of adding a basic material to the acidic liquor selected from the group consisting of ammonia and water soluble ammonium, sodium and potassium carbonates and hydroxides in an amount to precipitate hydrous vanadium oxide and at least one contaminant selected from the group consisting of aluminum, iron and manganese, intermixing an elemental oxygen-containing gas with aqueous medium containing the said precipitate of hydrous vanadium oxide and contaminant to oxidize quadrivalent vanadium values to the quinquivalent state and solubilize the vanadium in the aqueous medium without solubilizing the said precipitate of the contaminant, the aqueous medium having an initial pH of at least 7.5 and containing one to four chemical equivalents of a basic material selected from the group consisting of ammonia and water soluble ammonium, sodium and potassium carbonates and hydroxides for each chemical equivalent of vanadium present in the said precipitate, separating insoluble contaminating precipitate from the oxidized aqueous medium to produce a purified solution of dissolved quinquivalent vanadium values, and precipitating the quinquivalent vanadium values from the purified solution as a vanadium compound.

2. The process of claim 1 wherein the elemental oxygen-containing gas is air.

3. The process of claim 1 wherein the basic material is ammonia.

4. The process of claim 1 wherein the basic material is ammonium hydroxide.

5. The process of claim 1 wherein the basic material is ammonium carbonate.

6. A process for recovering vanadium values from an acidic aqueous hydrometallurgical liquor containing dissolved quadrivalent vanadium values and at least one dissolved contaminant selected from the group consisting of aluminum, iron and manganese values comprising the steps of adding a basic material to the acidic liquor selected from the group consisting of ammonia and water soluble ammonium, sodium and potassium carbonates and hydroxides in an amount to precipitate hydrous vanadium oxide and at least one contaminant selected from the group consisting of aluminum, iron and manganese, separating mother liquor from the said precipitate of hydrous vanadium oxide and contaminant, suspending the said precipitate of hydrous vanadium oxide and contaminant in an alkaline aqueous medium, adding to said aqueous medium a compound soluble therein which provides ions selected from the group consisting of copper ions and cobalt ions in an amount effective to catalyze the oxidation, intermixing an elemental oxygen-containing gas with the aqueous medium to oxidize the quadrivalent vanadium values to the quinquivalent state and solubilize the vanadium in the aqueous medium without solubilizing the said precipitate of the contaminant, the aqueous medium having an initial pH of at least 7.5 and containing one to four chemical equivalents of a basic material selected from the group consisting of ammonia and water soluble ammonium, sodium and potassium carbonates and hydroxides for each chemical equivalent of vanadium present in the suspended precipitate, separating the said insoluble contaminating precipitate from the oxidized aqueous medium to produce a purified solution of dissolved quinquivalent vanadium values, and precipitating the quinquivalent vanadium values from the purified solution as a purified vanadium compound.

References Cited in the file of this patent

UNITED STATES PATENTS

| | | |
|---|---|---|
| 1,765,870 | Jaeger et al. | June 24, 1930 |
| 2,176,609 | McCormack | Oct. 17, 1939 |
| 2,298,091 | Cooper et al. | Oct. 6, 1942 |
| 2,372,109 | Noel | Mar. 20, 1945 |
| 2,770,522 | Bailes et al. | Nov. 13, 1956 |

UNITED STATES PATENT OFFICE
CERTIFICATE OF CORRECTION

Patent No. 3,132,920

May 12, 1964

Mayer B. Goren

It is hereby certified that error appears in the above numbered patent requiring correction and that the said Letters Patent should read as corrected below.

Column 6, line 18, for "of", first occurrence, read -- with --; column 7, line 18, for "preciptate" read -- precipitate --.

Signed and sealed this 29th day of September 1964.

(SEAL)
Attest:

ERNEST W. SWIDER
Attesting Officer

EDWARD J. BRENNER
Commissioner of Patents